United States Patent [19]

Matsumaru et al.

[11] Patent Number: 4,830,803
[45] Date of Patent: May 16, 1989

[54] METHOD OF MAKING A MOLDED ARTICLE OF METHACRYLIC RESIN

[75] Inventors: Shigeo Matsumaru, Kawaguchi; Akihiro Mochizuki, Oomiya; Syuzi Isoi, Saitama, all of Japan

[73] Assignee: Kyowa Gas Chemical Industry Co., Ltd., Tokyo, Japan

[21] Appl. No.: 4,667

[22] Filed: Jan. 20, 1987

[51] Int. Cl.4 .................... B32B 27/30; B32B 31/00; B32B 31/04
[52] U.S. Cl. .................... 264/135; 264/236; 264/255; 264/331.18; 264/DIG. 59; 427/393.5; 427/412.1; 525/451; 526/328.5; 526/329.7
[58] Field of Search .............. 264/22, 135, 236, 255, 264/325, 331.18, 331.21, 338, 347, DIG. 57, DIG. 59; 427/54.1, 393.5, 412.1; 428/520, 522; 522/113, 182; 525/228, 418, 451; 526/328, 328.5, 329.7

[56] References Cited

U.S. PATENT DOCUMENTS

| | | | |
|---|---|---|---|
| 2,899,402 | 8/1959 | Squire | 264/347 X |
| 2,910,456 | 10/1959 | de Gooreyno et al. | 264/DIG. 59 |
| 2,912,418 | 11/1959 | Johnson et al. | 264/DIG. 59 |
| 2,997,745 | 8/1961 | Kroeker | 264/331.18 X |
| 3,135,723 | 6/1964 | Vandegaer . | |
| 3,518,341 | 6/1970 | Haryu | 264/255 |
| 3,968,305 | 7/1976 | Oshima et al. | 522/182 X |
| 3,968,306 | 7/1976 | Yoshihara et al. | 526/328.5 X |
| 3,968,309 | 7/1976 | Matsuo et al. | 428/520 X |
| 3,978,178 | 8/1976 | Oshima et al. | 264/255 X |
| 4,041,120 | 8/1977 | Oshima et al. | 264/255 X |
| 4,076,788 | 2/1978 | Ditto | 264/255 |
| 4,199,421 | 4/1980 | Kamada et al. | 264/22 X |
| 4,273,799 | 6/1981 | Kamada et al. | 264/22 X |
| 4,273,802 | 6/1981 | Kamada et al. | 427/54.1 |
| 4,274,933 | 6/1981 | Kamada et al. | 264/22 X |
| 4,338,269 | 7/1982 | Russell | 264/22 |
| 4,339,474 | 7/1982 | Kishida et al. | 427/54.1 |
| 4,367,245 | 1/1983 | Kishida et al. | 427/54.1 |
| 4,371,566 | 2/1983 | Russell | 427/54.1 X |
| 4,373,007 | 2/1983 | Russell | 427/54.1 X |
| 4,386,042 | 5/1983 | Tatebayashi | 264/135 |
| 4,397,723 | 8/1983 | Inoue et al. | 427/54.1 X |
| 4,415,509 | 11/1983 | Toyooka et al. | 264/236 X |
| 4,581,268 | 4/1986 | Ohe et al. | 428/522 X |
| 4,637,904 | 1/1987 | Rounds | 264/22 X |

FOREIGN PATENT DOCUMENTS

| | | | |
|---|---|---|---|
| 45-31953 | 10/1970 | Japan . | |
| 48-95490 | 12/1973 | Japan . | |
| 49-10156 | 3/1974 | Japan . | |
| 49-48747 | 5/1974 | Japan | 264/22 |
| 54-14617 | 6/1979 | Japan . | |
| 54-14618 | 6/1979 | Japan . | |
| 55-34924 | 3/1980 | Japan | 264/135 |
| 57-79009 | 5/1982 | Japan . | |
| 60-212128 | 10/1985 | Japan . | |
| 62-20513 | 1/1987 | Japan | 526/328.5 |
| 615985 | 1/1949 | United Kingdom | 264/331.18 |
| 889486 | 2/1962 | United Kingdom | 264/216 |
| 0158478 | 10/1985 | United Kingdom . | |

Primary Examiner—Jeffery Thurlow
Assistant Examiner—Leo B. Tentoni
Attorney, Agent, or Firm—Gordon W. Hueschen

[57] ABSTRACT

A molded article of methacrylic resin formed of a cross-linked polymer having at least part of the surface thereof coated with an abrasion resistant layer in contact with a basic molding material made of a methacrylic partially cross-linked gel thereby allowing the methacrylic partially cross-linked gel consequently produced to possess the property of retaining the polymerization in a stopped state, and simultaneously polymerizing said two materials held in mutual contact under a condition capable of imparting a desired shape to the combined materials.

6 Claims, 1 Drawing Sheet

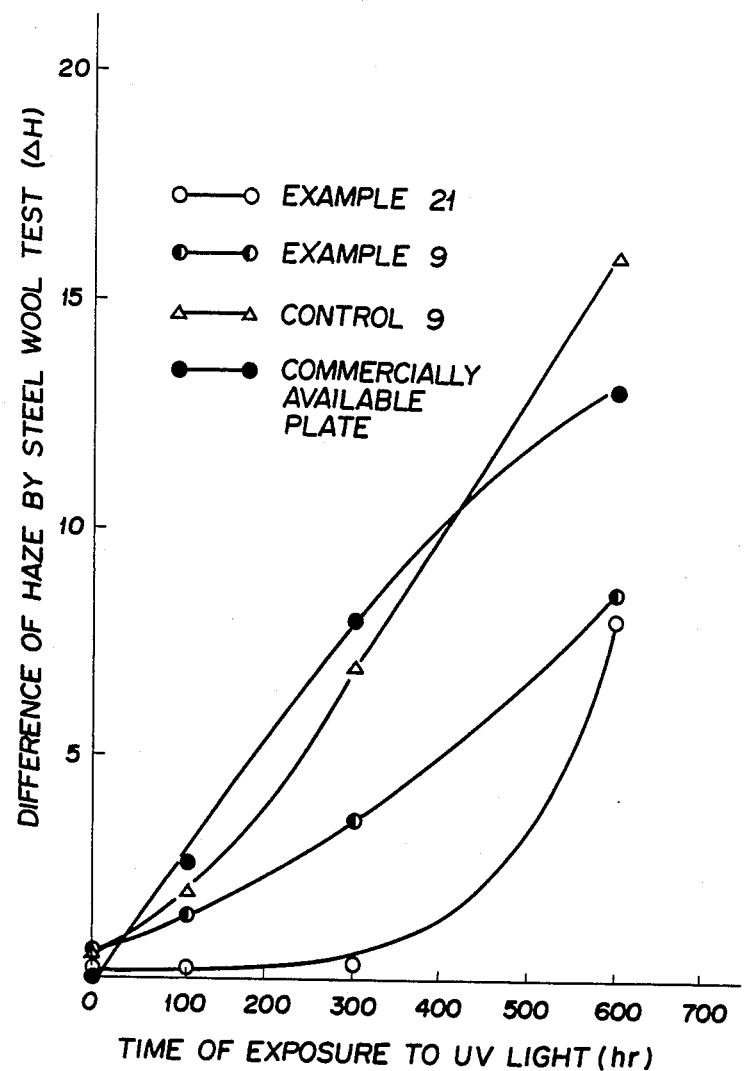

METHOD OF MAKING A MOLDED ARTICLE OF METHACRYLIC RESIN

BACKGROUND OF THE INVENTION

1. Field of the Invention

This invention relates to a molded article of methacrylic resin excelling in transparency, weatherability, and abrasion resistance and possessing high heat resistance and to a method for the production thereof.

2. Description of the Prior Art

Methacrylic resins excel in appearance, transparency, and weatherability and, therefore, find extensive utility in indoor and outdoor applications to glazings, lampshades, decorations, etc. They, however, are inferior in heat resistance to inorganic glass and are further deficient in scratch proofness. When they have these qualities improved, they can be expected to attain further growth in utility. Various studies are now under way in search of means of mending such drawbacks as mentioned above. Generally, there prevails a practice of forming synthetic resin molding materials by the use of various molding machines such as press molding machine, injection molding machine, extrusion molding machine, and vacuum molding machine or by the polymerization and formation in casting dies and then applying abrasion resistant film-forming materials on the surface of the resulting molded articles by the technique of spraying or dipping and polymerizing and hardening the applied layers of the film-forming materials by means of electron beam or heat thereby covering the molded articles with abrasion resistant thin films. The problem encountered by this method resides in the fact that since the step of polymerization for the formation of the abrasion resistant thin film is carried out subsequent to the step of molding, such expensive facilities as those for coating, curing, and dust removing must be disposed separately of those used for the molding and the operation of this method entails complicate management such as of the viscosity of the film-forming materials, for example.

As means of improving the method just described, Japanese Patent Publication SHO 54(1979)-14,617 and SHO 54(1979)-14,618 disclose a method for producing a molded article of synthetic resin possessing an abrasion resistant surface, which comprises applying an abrasion resistant film-forming material on a mold, polymerizing the material as covered with a synthetic resin film or kept under an atmosphere of inert gas, relieving the material being polymerized of the film or the inert gas after the gel content has reached a level in the range of about 40 to 95%, post-curing the polymerized material generally until the gel content reaches a level not lower than 85% thereby allowing the material to assume a state neither swelled nor dissolved by the basic resin material to be poured therein afterward, pouring the basic resin material into the mold, and polymerizing and forming the resin material. This method, however, entails inevitable complication of process because the impartation of abrasion resistance to the required two steps of polymerization, i.e. prior polymerization and post polymerization. In this case, when the prior polymerization is exclusively used, the produced molded article acquires a defective appearance because the surface thereof has craters and cracks, shows uneven abrasion resistance, and fails to exhibit ample abrasion resistance.

As a second problem, insufficient adhesiveness between the basic resin and the abrasion resistant thin film can be cited. As means of solving this problem, there exists a method which resorts to interposing between the abrasion resistant thin film and the basic resin a layer capable of adhering to both the outer layers. This method suffers from poor productivity because it requires the step of application and the step of plolymerizing the applied layer to be repeated at least twice. The molded article obtained by this method has a disadvantage that since pinholes due to the contamination of dust existing in the abrasion resistant film is inevitable and tends to allow the adhesive layer to be dissolved at those points, the parts of the coat centering around the pinholes as the cores suffer from notable impairment of the resistance to solvent Japanese Patent Publication SHO 53(1978)-9,876 discloses a method which effects improvement of adhesiveness by exposing the surface of a molded article to ultraviolet light and applying a abrasion resistant thin film on this surface of the molded article. This method, however, is complicate in process because it requires both the molded article and the film formed thereon to be separately exposed to ultraviolet light. The abrasion resistant thin film formed by this method on the molded article has been demonstrated by a QUV weathering test to have not served the purpose of improving the abrasion resistance of the molded article. There also prevails a practice of adding to the raw material for the abrasion resistant thin film a good solvent for the basic molding resin. If this power is too high, this practice has the dissibility of inflicting cracks on the surface of the molded article or impairing the smoothness of the surface. Conversely, if the power is weak, the desired tight adhesion is not obtained. Thus, this practice entails complication in the formulation of the solvent and, at the same time, requires installation of facilities exclusively for disposal of the waste gas resulting from the vaporization of the solvent, for example.

Methacrylic resins using methyl methacrylate as a main component possess excellent weatherability and outstanding transparency and, therefore, have found utility in applications to lampshades and automobile parts. These methacrylic resins, however, are linear polymers and, therefore, do not suit applications which demand relatively high heat resistance, resistance to solvents, resistance to shocks, and surface hardness. In terms of heat resistance, they cannot be used in applications requiring protracted exposure to elevated temperatures exceeding 100° C., such as those to head lamp lens for automobiles, covers for solar heat warmers, etc.

Heretofore, for the purpose of improving heat resistance of methacrylic resins, there have been introduced numerous methods such as, for example, a method which relies on copolymerization to methyl methacrylate with α-methyl styrene (U.S. Pat. No. 3,135,723), a method which resorts to copolymerization of methyl methacrylate with α-methyl styrene and maleic anhydride (Japanese Patent Publication SHO 45(1970)-31,953 and Japanese Patent Publication SHO 49(1974)-10,156), and a method which adopts copolymerization of methyl methacrylate with α-methyl styrene and maleimide (Japanese Patent Laid-Open SHO 48(1973)-95,490).

Although these methods are invariably capable of improving heat resistance, some of them suffer from notably low rates of polymerization and fail to attain high ratios of polymerization and some others, though capable of producing polymers efficiently in relatively short spans of time, suffer the produced polymers to assume colors strongly and degrade in transparency, weatherability, surface hardness, mechanical strength, etc.

It has been separately proposed to produce a molded article using a gel polymer which is obtained by partially cross-linking an alkyl methacrylate homopolymer or syrup with a cross-linking agent (Japanese Patent Laid-Open SHO 60(1985)-212,128). This method is capable of producing a cross-linked molded article excelling in transparency and heat resistance. When an abrasion resistant thin film is applied on this molded article, there ensues a disadvantage that this molded articles exhibits poor adhesiveness to the abrasion resistant thin film. For effective application of this film on the surface of the molded article, it becomes necessary to enhance the adhesiveness of the film by subjecting this molded articles to a complicated preparatory treatment as mentioned above.

An object of this invention, therefore, is to provide a molded article of methacrylic resin excelling in both abrasion resistance and heat resistance, and more particularly a molded article of methacrylic resin having a abrasion resistant thin film adhere fast thereto and enjoying high heat resistance.

Another object of this invention is to provide a method for easy production of a molded article of the foregoing description.

SUMMARY OF THE INVENTION

The objects described above are accomplished by a molded article of methacrylic resin formed of a cross-linked polymer having at least part of the surface thereof coated with an abrasion resistant layer, produced by placing (A) an abrasion resistant layer-forming material selected from the group consisting of (a) cross-linked polymerizing compounds having a molecular weight of not less than 150 and containing at least two (meth)acryloyloxy groups per molecule, (b) mixtures of at least 30% by weight of the cross-linked polymerizing compounds with other copolymerizable monomers, and (c) partial polymerization products thereof, and possessed of a composition such that the number, x, of the (meth)acryloyloxy groups of the crosslinked polymerizing compound and the ratio of polymerization y (%), of the abrasion resistant layer-forming material satisfy the following formula I or II:

$$y \leqq 70 \ (2 \leqq x \leqq 3.5) \quad (I)$$

$$y \leqq -7.5x^2 + 52x - 18 \ (3.5 < x \leqq 6) \quad (II)$$

in contact with (B) a basic molding material made of an acrylic partially cross-linked gel obtained by partially polymerizing a mixture of (i) a resin material selected from the group consisting of alkyl methacrylate monomers, mixtures of alkyl methacrylates as main components with α, β-ethylenically unsaturated monomers, and syrups containing polymers thereof with (ii) 3 to 30 parts by weight, based on 100 parts by weight of the resin material, of a cross-linking agent and stopping the partial polymerization when the gel content of the partial polymer reaches a level in the range of 15 to 95% thereby allowing the gel consequently produced to possess the property of retaining the polymerization in a stopped state, and simultaneously polymerizing the two materials held in mutual contact under a condition capable of imparting a desired shape to the combined materials.

These objects are further accomplished by a method for the production of a molded article of methacrylic resin formed of a cross-linked polymer having at least part of the surface thereof coated with an abrasion resistant layer, which method comprises placing (A) an abrasion resistant layer-forming material selected from the group consisting of (a) crosslinked polymerizing compounds having a molecular weight of not less than 150 and containing at least two (meth)acryloyoxy groups per molecule, (b) mixtures of at least 30% by weight of the cross-linked polymerizing compounds with other copolymerizable monomers, and (c) partial polymerization products thereof, and possessed of a composition such that the number, x, of the (meth)acryloxyloxy groups of the cross-linked polymerizing compound and the ratio of polymerization, y, (%), of the abrasion resistant layer-forming material satisfy the following formula (I) or (II):

$$y \leqq 70 \ (2 \leqq x \leqq 3.5) \quad (I)$$

$$y \leqq -7.5x^2 + 52x - 18 \ (3.5 < x \leqq 6) \quad (II)$$

contact with (B) a basic molding material made of an acrylic partially cross-linked gel obtained by partially polymerizing a mixture of (i) a resin material selected form the group consisting of alkyl methacrylate monomers, mixtures of alkyl methacrylates as main components with α, β-ethylenically unsaturated monomers, and syrups containing polymers thereof with (ii) 3 to 30 parts by weight, based on 100 parts by weight of the resin material, of a cross-linking agent and stopping the partial polymerization when the gel content of the partial polymer reaches a level in the range of 15 to 95% thereby allowing the gel consequently produced to possess the property of retaining the polymerization in a stopped state, and simultaneously polymerizing the two materials held in mutual contact under a condition capable of imparting a desired shape to the combined materials.

BRIEF DESCRIPTION OF THE DRAWING

The drawing is a graph showing the relation between the time of exposure to ultraviolet light and the difference of haze by the steel wool test, obtained by molded articles produced in accordance with this invention, articles produced by forming an abrasion resistant thin film on the molded articles, and a commercially available abrasion resistant plate.

DESCRIPTION OF PREFERRED EMBODIMENT

In the molding material (B) formed of an acrylic partially cross-linked gel of the present invention, the monomer to be used as the resin material (i) is an alkyl methacrylate monomer or a mixture of an alkyl methacrylate as a main component with a copolymerizable α, β-ethylenically unsaturated monomer. In the monomer mixture, the proportion of alkyl methacrylate is not less than 50 mol %, preferably not less than 60 mol %. Typical examples of alkyl methacrylate include methyl methacrylate, ethyl methacrylate, n-propyl methacrylate, isopropyl methacrylate, n-butyl methacrylate, sec-butyl methacrylate, tert-butyl methacrylate, lauryl methacrylate, and cyclohexyl methacrylate. One member or a mixture of a plurality of members selected from the group mentioned can be used. Among other alkyl methacrylates enumerated above, lower alkyl methacrylates, particularly methyl methacrylate, prove to be particularly desirable.

Example of the copolymerizable monomer include alkyl acrylates such as methyl acrylate, ethyl acrylate, propyl acrylate, n-butyl acrylate, 2-ethylhexyl acrylate, and lauryl acrylate, cyclohexyl acrylate, hydroxyalkyl acrylates such as 2-hydroxyethyl acrylate, and hydroxyalkyl methacrylates such as 2-hydroxyethyl methacrylate, 3-hydroxypropyl methacrylate, 4-hydroxybutyl methacrylate, and 2-hydroxy-3-chloropropyl methacrylate.

The aforementioned syrup containing the polymer of an alkyl methacrylate or a monomer mixture having an alkyl methacrylate as a main component thereof is a monomer which possesses a viscosity in the range of 1 to 20,000 cps at 25° C. and contains 3 to 40% by weight, preferably 6 to 20% by weight, of the polymer.

The cross-linking agent (ii) to be used in the present invention is desired to possess at least two (meth)acryloyl groups per molecule and contain not more than 10 atoms as interposed between the aforementioned (meth)acryloyl groups. Specifically, it is one of the compounds represented by the following formulas III through V.

$$MA-O(CH_2)_nO-MA \quad (III)$$

wherein n stands for an integer of the value of 3 to 6 and MA for a methacryloyl group.

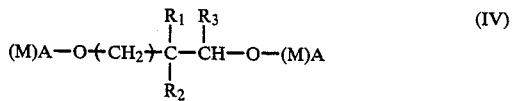

$$(M)A-O(CH_2)\underset{R_2}{\overset{R_1}{-}C-}\overset{R_3}{\underset{}{CH}}-O-(M)A \quad (IV)$$

wherein $R_1$ stands for H, $CH_3$, $C_2H_5$, or $CH_2OH$, $R_2$ for H, $CH_3$,

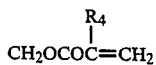

$$\underset{}{\overset{R_4}{\underset{}{CH_2OCOC=CH_2}}}$$

(wherein $R_4$ stands for H or $CH_3$), or $CH_2OH$, $R_3$ for H or $CH_3$, providing that $R_1$, $R_2$, and $R_3$ do simultaneously stand for hydrogen, and (M)A stands for a methacryloyl group or an acryloyl group, and

$$(M)AC(CH_2CH_2O)_n(M)A \quad (V)$$

wherein n stands for an integer of the value of 1 or 2 and (M)A for a methacyloyl group or an acryloyl group.

As typical examples of the compounds, there can be cited 1,3-propylene glyciol dimethacrylate, 1,4-butylene glycol dimethacrylate, 1,6-hexanediol dimethacrylate, 1,3-butylene glycol dimethacrylate, dimethylol ethane diemthacrylate, 1,1-dimethylol propane dimethacrylate, 2,2-dimethylol propane dimethacrylate trimethylol ethane tri(meth)acrylate, trimethylol propane tri(meth)acrylate, tetramethylol methane tri(meth)acrylate, tetramethylol methane dimethacrylate, ethylene glycol di(meth)acrylate, and diethylene glycol glycol di(meth)acrylate.

The amount of the cross-linking agent to be incorporated is in the range of 3 to 30 parts by weight, preferable 10 to 25 parts by weight, based on 100 parts by weight of the aforementioned resin material (i). If this amount is less than 3 parts by weight, the heat resistance is not sufficient. If the amount exceeds 30 parts by weight, the polymerization disadvantageously is required to be carried out for a long time and in addition say the product shows inferior weatherability.

In the present invention, a polymerization initiator is used when the partially cross-linked gel is prepared and when the gel and the abrasion resistant layer-forming material are brought into mutual contact and subjected to polymerization in situ. This polymerization initiator can be one member or a mixture of a plurality of members selected from the group consisting of low temperature-active polymerization initiators and high temperature-active polymerization initiators. Generally, a temperature-active polymerization initiator is suitable for the preparation of the partially cross-linked gel. Among other low temperature-active polymerization initiators, those whose decomposition temperatures for obtaining a half-value period of 10 hours fall below 50° C., preferably in the range of 26° to 45° C. prove to be particularly desirable. Radical polymerization initiators of peroxides and azo compounds whose decomposition temperatures fall in the range of 26° to 41° C. are preferred selections.

The amount of the polymerization initiator to be used is in the range of 0.002 to 1% by weight, preferably 0.005 to 0.1% by weight, based on the total amount of the resin material (i) and the cross-linking agent(ii).

Examples of the low temperature-active polymerization initiator advantageously usable herein include (I) acetylcyclohexylsulfonyl peroxide, isobutyryl peroxide, cumyl peroxy-neodecanoate, diisopropyl peroxydicarbonate, dimyristyl peroxydicarbonate, and 2,2'-azobis (4-methoxy-2,4-dimethyl valeronitrile), (II) di(2-ethoxyethyl) peroxydicarbonate, di(methoxyisopropyl)-peroxy dicarbonate, and di(2-ethylhexyl) peroxydicarbonate, and (III) di(3-methyl-3-methoxybutyl)peroxy dicarbonate, t-butylperoxydecanoate, and 2,2'-azobis (2,4-dimethylvaleronitrile). In the low temperature-active polymerization initiators enumerated above, the compounds belonging to the groups (I) and (II) prove to be desirable and those belonging to the group (I) prove to be particularly desirable.

High temperature-active polymerization initiators are suitable for the polymerization to be carried out in the present invention under molding conditions and, therefore, are desired to possess decomposition temperatures in the range of 60° to 220° C., preferably 70° to 170° C. The amount of the high temperature-active polymerization initiator to be used is desired to fall in the range of 0.02 to 5.0% by weight, preferably 0.05 to 4% by weight, based on the total amount of the resin material (i) and the cross-linking agent (ii).

Example of the high temperature-active polymerization initiator advantageously usable herein include (IV) t-butylcumyl peroxide, diisopropyl benzene hydroperoxide, di-t-butyl peroxide, p-methane hydroperoxide, 1,1,3.3-tetramethylbutyl hydroperoxide, 2,5-dimethylhexane-2,5-dihydroperoxide, cumene hydroperoxide, t-butyl-hydroperoxide, and 1,1,2,2tetraphenyl-1,2-ethanediol, (V) 1,1-bis (t-butylperoxyl)3,3,5-trimethyl cyclohexane, t-butylperoxylaurate, cyclohexanone peroxide, t-butylperoxyisopropyl carbonate, 2,5-bis(t-butylperoxy)octane, t-butylperoxy acetate, 2,2-bis (t-bitylperoxy)butane, t-butylperoxy benzoate, di-t-butyl-diperoxy isophthalate, and methylethyl ketone peroxyde, and α, α'-bis(t-butyl-peroxyisopropyl)-benzene, dicumylperoxide, and (VI) t-butyl hydroperoxide, m-toluoyl peroxide, benzoyl peroxide, t-butylperoxy isobutyrate, octanoyl peroxide, lawroyl peroxide, succinic acid peroxide, acetyl peroxide, and 1,1′-azobis(cyclohexane-1-carbonitrile). In the high temperature-active polymerization initiators enumerated above, the compounds belonging to the groups IV and V prove to be desirable and those belonging to the group IV prove to be particularly desirable.

In the present invention, the partially cross-linked gel is prepared by heating the mixture of the resin material (i) with the cross-linking agent (ii) in the presence of the polymerization initiator thereby causing polymerization thereof. This reaction of polymerization is carried out at a temperature in the range of 10° to 80° C., preferably 35° to 65° C., for a period in the range of 10 to 200 minutes, preferably 20 to 150 minutes. When the low temperature active-polymerization initiator and the high temperature-active polymerization initiator are used simultaneously herein, the prior polymerization initiator is consumed substantially wholly and the post polymerization initiator remains in its undissolved state at the aforementioned reaction temperature and, afterward, allowed to function as a polymerization initiator under the conditions of the subsequent molding operation.

The gel content of the partially cross-linked gel is desired to be in the range of 15 to 95%, preferably 15 to 75%. If the gel content is less than 15%, the mixture being molded is liable to foam and the produced molded article to sustain cracks or undergo deformation. If the gel content exceeds 95%, the mixture being polymerized fails to show good flowability.

The partially cross-linked gel having a desired ratio of polymerization can be obtained by stopping the reaction of polymerization by suddenly cooling the reaction system undergoing the polymerization or by suitably selecting the amount of the low temperature-active polymerization initiator, the temperature of polymerization, and the time of polymerization. This is accomplished more readily by adding a specific regulating agent in a specific amount to the mixture of the resin material (i) with the cross-linking agent (ii) when it is to be thermally polymerized in the presence of the aforementioned polymerization initiator.

Examples of this specific regulating agent include 1,4(8)-p-menthadiene, 2,6-dimethyl-2,4,6-octatriene, 1,4-p-menthadiene, 1,4-cyclohexadiene, and α-methylstyrene dimer.

The regulating agent of the foregoing description can be used in an amount in the range of 0.0001 to 0.5% by weight, desirably 0.001 to 0.2% by weight, and most desirably 0.005 to 0.1% by weight, based on the total amount of the aforementioned resin material (i) and the cross-linked polymerizing compound. If the amount of the regulating agent to be added is less than 0.0001% by weight, the desired effect of regulation cannot be manifested. If the amount exceeds 0.5% by weight, the desired gel content of the polymer cannot be attained.

Since the basic molding material is not viscous and possesses the property of retaining the shape intact, it can be handled in any desired form such as, for example, sheet, rod, block, and pellets.

For the convenience of molding, for example, the basic molding material may be dispersed or kneaded or, when necessary, may incorporate therein a coloring agent or some other additive prior to being molded.

The abrasion resistant layer-forming material is a cross-linked polymerizing compound possessing a molecular weight exceeding 150, desirably falling in the range of 200 to 2,000, preferably in the range of 200 to 1,200 and containing at least two acryloyloxy groups or methacryloyloxy groups, a mixture of not less than 30% by weight of the compound with other copolymerizable monomer, or a partial polymerization product thereof. The average number of (meth)acryloyloxy groups in the cross-linked polymerizing compound or the mixture thereof is desired to fall in the range of 2.0 to 6.0, preferably 2.5 to 5.5. If this number is less than 2, no sufficient abrasion resistance is obtained. If the number exceeds 6.0, the reaction sufficiently proceeds with difficulty and the product of the polymerization possesses poor weatherability such as to induce defective phenomena as yellowing and cracking.

The cross-linked polymerizing compound is such that the residue linked to the acryloyloxy group or methacryloyloxy group thereof is a hydrocarbon or a derivative thereof. This compound may contain in the molecular unit thereof an ether bond, a thioether bond, an ester bond, an amide bond or an urethane bond or may possess an isocyanuric acid skeleton or a melamine skeleton.

Examples of the compound usable advantageously herein include trimethylol propane triacrylate, 1,6-hexanediol diacrylate, neopentyl glycol diacrylate, hydroxybivalic acid neopentyl glycol diacrylate, dipentaerythritol hexaacrylate, caprolactammodified dipentaerythritol hexaacrylate, urethane acrylate, trisacryloxyl cyanurate, (meth)acryloxy compounds possessing an isocyanuric acid backbone, epoxyacrylate, and polyester acrylate.

As examples of the compounds, there can be cited trimethylol propane triacrylate, 1,6-hexanediol diacrylate, neopentilglycol diacrylate, hydroxy neopentilglycol diacrylate pibariate, dipentaerythritol hexaacrylate, caprolactam-mo-dified dipentaerythritol hexaacrylate, urethaneacrylate, tris-acryloyl cyanurate, epoxyacrylate and polyeter-acrylate.

As examples of the copolymerizable monomer usable advantageously herein as mixed with the aforementioned partialy cross-linked polymerizing compound, there may be cited methyl methacrylate, tetrahydrofurfuryl acrylate, ethylcarbitol acrylate, phenylcarbitol acrylate, hydroxyethyl acrylate, and 2-hydroxy-3-phenoxypropyl acrylate.

The abrasion resistant layer-forming material is required to be such that the number, x, of the (meth)acryloyloxy group and the ratio of polymerization, y (%), will satisfy the following formula I or II.

$$y \leq 70 \quad (2 \leq x \leq 3.5) \tag{I}$$

$$y \leq -7.5x^2 + 52x - 18 \quad (3.5 < x \leq 6) \tag{II}$$

When this compound satisfies the condition, it acquires sufficient adhesiveness relative to the basic molding material.

This ratio of polymerization, y, is determined by calculating the residual double bond content in percentage from the peak height of the absorption band due to C═C appearing near 4620 nm and then subtracting this percentage from 100%.

Adjustment of this ratio of polymerization may be effected by applying the abrasion resistant layer-forming material on the mold and subjected in situ to polymerization through the agency of heat or a photopolymerization initiator before the basic molding material is introduced into the mold or it may be polymerized in advance on the surface of a plastic film.

In the present invention, the abrasion resistant layer-forming material and the basic molding material formed of the partially cross-linked gel are simultaneously polymerized as held in a state of mutual contact. To be more specific, the abrasion resistant layer-forming material and the basic molding material are subjected to simultaneous polymerization with at least part of the surface of the latter material in contact with the former material so that at least part of the surface of the molded article formed of the cross-linked polymer produced from the basic molding material will be coated with the polymer layer formed of the abrasion resistant layer-forming material. This polymerization is carried out under the conditions capable of producing the molded article in a desired shape.

The molding can be carried out by (1) a method which comprises applying the abrasion resistant layer-forming material by suitable means such as spraying or rolling on the mold of a press molding machine or an injection molding machine heated to a temperature in the range of 80° to 160° C. in advance, polymerizing the applied layer of the material under the conditions falling in the aforementioned ranges, then introducing the basic molding material into the mold, and subjecting the introduced material to polymerization in situ or (2) a method which comprises applying the abrasion resistant layer-forming material by suitable means such as spraying or rolling on the surface of the basic molding material, introducing the coated basic molding material into the mold of a press molding machine heated to a temperature in the range of 80° to 160° C. in advance, and subjecting the introduced material to molding in situ. If the ratio of elongation in this case exceeds 72%, the molded article may possibly have both the portion containing the abrasion resistant layer and the portion containing no abrasion resistant layer.

Alternatively, the molding may be effected by (3) a method which comprises applying the abrasion resistant layerforming material on a film such as of synthetic resin, polymerizing this material through the agency of ultraviolet light or heat until a desired ratio of polymerization, superposing the basic molding material on the partially polymerized material, introducing the combined materials into the mold heated to a temperature in the range of 80° to 160° C. in advance, and subjecting them to molding in situ or (4) a method which comprises introducing the basic molding material into the mold heated to a temperature in the range of 80° to 160° C. in advance, allowing this material to be polymerized in situ partially to a prescribed ratio, opening the mold, applying the abrasion resistant layer-forming material by suitable means such as spraying on the surface of the mold or on the surface of the partially polymerized layer of the molding material or injecting the abrasion resistant layer-forming material between the mold and the partially polymerized layer of the molding material, then closing the mold, and subjecting the combined materials to molding in situ.

Thereafter, the molded article formed consequently is subjected to post-polymerization at a temperature in the range of 120° to 140° C. for a period of 3 to 12 hours for the purpose of improving the heat resistance of the basic molding material in the molded article.

As the initiator for the polymerization of the abrasion resistant layer-forming material, the same low temperature-active polymerization initiator and high temperature-active polymerization initiator as used during the preparation of the partially cross-linked gelled polymer can be used. Alternatively, a photopolymerization initiator may be used. Examples of the photopolymerization initiator include 1-hydroxycyclohexylphenyl ketone, benzyl dimethyl ketal, benzophenone, Michler's ketone, benzoin, acetophenone, 2-hydroxy2-methylphenyl-propane-1-on, 2,4-diethlthioxanthone, and 4-chlorothioxanthone.

The amount of the low temperature-active polymerization initiator to be incorporated is desired to fall in the range of 0.5 to 3% by weight, preferably 1 to 2% by weight, based on the amount of the cross-linked polymerizing compound or the mixture thereof with a copolymerizable monomer. If this amount is less than 0.5% by weight, the polymerization of the abrasion resistant layer is retarded and the abrasion resistant effect is not obtained sufficiently. If the amount exceeds 3% by weight, the abrasion resistant layer-forming material is set polymerizing before it is uniformly applied on the mold and, as the result, the layer consequently formed fails to acquire smooth surface.

The amount of the high temperature-active polymerization initiator to be incorporated is desired to fall in the range of 0.5 to 5% by weight, preferably 2 to 4% by weight. If this amount is less than 0.5% by weight, the polymerization is not sufficiently effected within the period of the molding and the formed abrasion resistant layer exhibits the abrasion resistant property insufficiently. If the amount exceeds 5% by weight, the formed abrasion resistant layer is set too quickly to estabilish sufficient adhesion between the basic molding material and the abrasion resistant layer.

In the methods cited previously as available for simultaneously effecting the molding of the basic molding material and the formation of the abrasion resistant layer, the photopolymerization initiator is desired to be used in the method of (1) or the method of (3) for the purpose of reducing the time required for the molding. The amount of this initiator to be incorporated is desired to be in the range of 0.2 to 1.0% by weight, preferably 0.3 to 0.6% by weight, though variable by the output of the lamp to be adopted for the generation of ultraviolet light. If this amount is less than 0.2% by weight, the formed layer fails to acquire a smooth surface because of occurrence of fine irregularities. If this amount exceeds 1.0% by weight, the formed layer is set too quickly to establish sufficient adhesion between this layer and the molding material.

For the purpose of coloring the molded article, either the basic molding material may incorporate therein a coloring material o the abrasion resistant layer-forming material may incorporate therein the coloring material.

Optionally, the abrasion resistant layer-forming material may incorporate therein a leveling agent, an ultraviolet absorbent, an antioxidant or other suitable agent proof against degradation.

By the method of this invention, there can be easily produced an acrylic resin product which excels in weatherability and heat resistance and possesses an abrasion resistant layer enjoying highly satisfactory rigidity and abrasion resistance and exhibiting very high adhesiveness to acryl.

Now, the present invention will be described more specifically below with reference to working examples.

EXAMPLES 1-3 AND CONTROL 1

A mixture prepared by dissolving 0.08 g of 1,4(8)-p-menthadiene, 0.05 g of cumylperoxy neodecanoate, and 2 g of di-t-butyl peroxide each per kg in 80 parts by weight of methyl methacrylate syrup containing 8% by weight of polymethyl methacryalte having an average polymerization degree of about 8,000 and 20 parts by weight of 2,2-dimethylol propane dimethacryalte was poured into a cell which had been formed by opposing two plate glasses 6 mm in wall thickness and 450×350 mm in area across an intervening space 10 mm in thickness and sealing the intervening space with a gasket of vinyl chloride resin. The cell thus filled to capacity with the mixture was immersed in a constant temperature water bath heated in advance to 50° C. and left standing therein for a varying length of time, to obtain a partially cross-linked gel being a mixture of monomer, homopolymer, crosslinking oligomer, and crosslinking polymer, and possessing a varying prescribed gel content. The gel content of the polymer was determined by keeping a prescribed amount (10 to 15 g) of the polymer in a finely cut form standing for 6 hours in acetone for extraction and then vacuum drying the insoluble residue of the extraction at 50° C. for 12 hours, finding the ratio of the weight of the insoluble residue to the weight of the polymer before the test, and reporting this ratio in percentage. From the partially cross-linked gel, a portion 200×180 mm in area was cut off. On the surface of the cut portion of the polymer, an abrasion resistant layer-forming material consisting of 70 parts by weight of dipentaerysritol hexaacrylate, 15 parts by weight of 1,6-hexanediol diacryalte, 15 parts by weight of tris-acryloyl cyanurate, and 10 parts by weight of methyl methacryalte plus 2% by weight of cumylperoxy neodecanoate and 3% by weight of di-t-butylperoxy-hexahydroterephthalate and having an average number of acryloyloxy groups of about 4.3 was applied by spraying. The coated polymer wa immediately introduced in a positive mold 200×180 mm in area heated to 130° C. and kept pressed therein for 10 minutes. Thus, the mold was opened and the molded product was removed there form. In a hot air circulation drier, this molded product was left polymerizing at 130° C. for 10 hours. It was then tested for tightness of adhesion, pencil hardness, and taber abrasion respectively in accordance with JIS Z 1522, JIS K 5400, and ASTM D 1044. Then, by the use of a scratch tester made by Toyo Seiki Seisakusho, a wad of steel wool, #000, pressed against the surface of the abrasion resistant thin film of the molded product with pressure of 100 g/cm$^2$ was reciprocated 100 times at a lateral speed of 16 mm/sec. In accordance with JIS K 7105, the cloud value, i.e. the ratio of the diffuse transmittance to the total light transmittance, was determined of the surface before and after the scratch test and the difference between the two haze values so obtained was reported as the scratching ability of the steel wool relative to the surface. The results of these tests were as shown in Table 1.

EXAMPLES 4-7 AND CONTROLS 2-3

A mixture prepared by dissolving 0.08 g of 1,4(8)-p-menthadiene, 0.05 g of cumyl peroxy neodecanoate, and 3 g of di-t-butyl peroxide each per kg in 80 parts by weight of methyl methacrylate syrup containing 8% by weight of polymethyl methacrylate having an average polymerization degree of about 8,000 and 20 parts by weight of 2,2-diemthylolpropane dimethacrylate was poured into a cell which was formed by opposing two plate glasses 6 mm in wall thickness and 450×350 mm in area across an intervening space 5 mm in thickness and sealing the intervening space with a gasket of vinyl chloride resin. The cell thus filled to capacity with the mixture was immersed in a constant temperature water bath heated in advance to 50° C. and left standing therein for 2.5 hours for polymerization of the contained mixture and, then, removed from the bath. The partially cross-linked gel consequently formed was subjected to extraction in acetone and then tested for the gel content by following the procedure of Examples 1-3. Thus, the gel content was found to be 28%. From this partially cross-linked gel, a portion of the same size as in Examples 1-3 was cut off. This portion of the polymer was placed in the same mold heated in advance to 120° C. as in Examples 1-3. After a varying length of polymerization time, i.e. 0.5 minute, 1 minute, 2 minutes, 3 minutes, 4 minutes, and 5 minutes, the mold was opened. The same abrasion resistant layer-forming material as used in Examples 1-3 was applied by spraying on the surface of the basic molding material in process of polymerization and the mold was immediately closed. The combined materials were kept pressed in the mold for 20 minutes. Then, the molded product consequently produced was removed from the mold. In a hot air circulation drier, this molded product was left polymerizing at 130° C. for 10 hours and then tested for scratching property and tightness of adhesion by following the procedure of Examples 1-3. The results were as shown in Table 1. For the determination of the gel content of the basic molding material, the portion of the partially cross-linked gel remaining in the same cell was treated under the same conditions in the same mold as those of the molding, removed from the mold after a varying length of time, i.e. 0.5 minute, 1 minute, 2 minutes, 3 minutes, 4 minutes, and 5 minute, and immediately immersed in liquefied nitrogen for sudden cooling. A prescribed amount (10 to 15 g) of the cooled polymer was subjected to acetone extraction by following the procedure of Examples 1-3.

EXAMPLES 8-11 AND CONTROL 4

A mixture prepared by dissolving 0.08 g of 1,4(8)-p-menthadiene, 0.03 g of 2,2'-azobis (4-methoxy-2,4-dimethyl valeronitrile), 0.05 g of di-t-butyl peroxy-hexahydroterephthalate, 1 g of 2,2-bis(t-butylperoxy)butane, and 3 g of di-t-butyl peroxide each per kg in 80 parts by weight of methyl methacrylate syrup containing 4% by weight of polymerthyl methacrylate having an average polymerization degree of about 12,000 and 20 parts by weight of 2,2-dimethylolpropane dimethacrylate was poured into the same cell as used in Examples 1-3. The cell thus filled to capacity with the mixture was immersed in a constant temperature water bath heated in advance to 50° C. and left standing therein for 2.5 hours for polymerization of the contained mixture. When the partially cross-linked gel consequently obtained was subjected to acetone extraction by following the procedure of Examples 1-3, the gel content thereof was found to be 36%. Then, the abrasion resistant layer-forming material of the same formula as used in Example 1 was applied by spraying on the inner surface of the cavity of the same mold as used in Example 1 heated in advance to 130° C. and heated for polymerization for a varying length of time, i.e. 0.5 minute, 1 minute, 5 minutes, 7 minutes, and 10 minutes. Then, on the partially polymerized abrasion resistant material, the aforementioned partially cross-linked gel was superposed. The mold was closed and the combined materials were kept pressued for 10 minutes. The molded product consequently obtained was removed from the mold and subjected to post-polymerization at 130° C. for 10 hours. The molded article was tested for abrasion resistance and tightness of adhesion by following the procedure of Example 1. The results were as shown in Table 1. For the determination of the ratio of polymerization of the abrasion resistant layer, the abrasion resistant layer-forming material was applied by the use of an applicator in the same thickness, left standing for a varying length of time, i.e. 0.5 minute, 1 minute, 5 minutes, 7 minutes, and 10 minutes, removed and suddenly cooled. The residual double bond content of the resulting polymer was calculated by the infrared ray method based on the peak height of the absorption band due to C=C appearing near 1620 mm and expressed in percentage. The ratio of polymerization was then found by subtracting this percentage from 100%. The results of these tests were as shown in Table 1. In the same table, the results separately obtained by the same extraction method as used in Examples 1-3 mere additionally shown for comparison.

EXAMPLES 12-13

A mixture prepared by dissolving 0.04 g of cumylperoxy neodecanoate and 2 g of di-t-butyl peroxide each per kg in 80 parts by weight of methyl methacrylate containing 4% by weight of polymethyl methacrylate having an average polymerization degree of about 12,000 and 20 parts by weight of 2,2-dimethylol propane dimethacrylate was poured into the same cell as used in Example 4 and then polymerized in a constant temperature water bath at 50° C. for 2 hours. The partially cross-linked gel consequently obtained had a gel content of 74%. Then, by following the procedure of Example 8, the abrasion resistant layer-forming material of the same formula was applied on the inner surface of the mold cavity and then left polymerizing for a varying length of time, i.e. 1 minute and 7 minutes. A portion 200×180 mm in area cut from the aforementioned partially cross-linked gel was superposed on the consequently formed layer of the abrasion resistant material and subjected to molding. Then, the molded product consequently obtained was subjected to after-polymerization at 130° C. for 0 hours and tested for abrasion resistance and tightness of adhesion by following the procedure of Example 1. The results were as shown in Table 1.

EXAMPLE 14-15

An abrasion resistant layer-forming material of the same formula as used in Example 1 was polymerized for a varying length of time, i.e. 1 minute and 7 minutes by following the procedure of Example 12. A portion 200×180 mm in area was cut from the partially cross-linked gel of Example 1 was superposed on the partially polymerized abrasion resistant material and kept pressed for 20 minutes, to obtain a molded product. This molded product was subjected to after-polymerization at 130° C. for 10 hours and then tested for scratching property by following the procedure of Example 1. The results were as shown in Table 1.

EXAMPLE 16-19 AND CONTROL 5

An abrasion resistant layer-forming material having an average number of acryloyloxy groups of about 3.3 was obtained by dissolving 2% by weight of cumylperoxy neodecanoate and 0.2% by weight of di-t-butylperoxyhexahydrophthalate in 15 parts by weight of dipentacerythritol hexaacrylate, 10 parts by weight of 1,6-hexanediol diacrylate, 22.5 parts by weight of trisacryloyl cyanurate, and 5 parts by weight of methyl methacrylate. This abrasion resistant layerforming material was applied in a thickness of 45 to 50 μm on the surface of the same mold as used in Example 1 heated in advance to 130° C., then left standing in situ for a varying length of time, i.e. 1 minute, 5 minutes, 10 minutes, 15 minutes, and 20 minutes. Then, the same partially cross-linked gel as used in Example 8 and thermally molded for 10 minutes. The resultant molded sheet was subjected to 10 hours after polymerization at 130° C. and tested for abrasion resistant by following the procedure of Example 1. The results were as shown in Table 1.

EXAMPLE 20-21 AND CONTROL 6

An abrasion resistant layer-forming material prepared by dissolving 2% by weight of cumylperoxy neodecanoate and 0.3% by weight of di-t-butylperoxyhexahydroterephthalate in 100 parts by weight of dipentaerythritol hexaacrylate and having an average number of acryloyloxy groups of 5.5 was applied by spraying in a thickness of 45 to 50 μm on the surface of the same mold as used in Example 1 and heated in advance to 130° C. and left standing thereon for a varying length of time, i.e. 0.5 minute, 1 minute, and 2 minutes. Then, the same partially cross-linked gelled polymer as used in Example 8 was superposed on the formed layer and subjected to thermal molding for 10 minutes. The molded product consequently obtained was subjected to 10 hours' post-polymerization at 130° C. and tested for abrasion resistant by following the procedure of Example 1. The results were as shown in Table 1.

EXAMPLES 22-23, AND CONTROL 7

On a polyethylene terephthalate film, an ultraviolet light curring abrasion resistant layer-forming material (produced by General Aniline and Film Company and marketed under trademark designation of "GAF-GUADE-233") was applied in a thickness of 45 to 50 μm with an applicator. The coated surface of the film was irradaited for a varying length of time, i.e. 6 minutes, 8 minutes, and 10 minutes, with the light from two 50-W chemical lamps aprallelly disposed at a height of 5 cm. The film and the same partially crosslinked gel as obtained in Example 1 brought into contact with the coated surface of the film were placed in the same mold as used in Example 1, left setting under pressure at 120° C. for 20 minutes, and subjected to 10 hours' postpolymerization at 130° C., and tested for resistance by following the procedure of Example 1. The results were as shown in Table 1.

CONTROL 8

A portion 200×180 mm in area cut from the same partially cross-linked gel as used in Example 8 was placed in the same mold as used in Example 1, kept pressed therein for 10 minutes, removed from the mold, and subjected to 10 hours' post-polymerization at 130° C. The molded product consequently obtained was tested for abrasion resistance by following the procedure of Example 1. The results were as shown in Table 1.

EXAMPLE 24

An abrasion resistant layer-forming material was obtained by adding 0.5% by weight of 2-hydroxy-2-methyl-phenylpropan-1-one to 75 parts by weight of dipentaerythritol hexaacrylate, 10 parts by weight of tris-acryloyl cyanurate, 15 parts by weight of 1,6-hexanediol diacrylate, and 5 parts by weight of methyl methacrylate. This abrasion resistant layerforming material was applied by spraying in a thickness of 25 to 30 μm on the inner surface of the same mold as used in Example 1 heated in advance to 130° C., and irradiated with the light from a high-pressure mercury-vapor lamp having an output of 80 W/cm for five seconds. Then, the basic molding material was superposed on the formed layer and kept pressed for 10 minutes. The molded product consequently obtained was removed from the mold and subjected to 10 hours' postpolymerization at 130° C. and tested for abrasion resistance by following the procedure of Example 1. The results were as shown in Table 1.

EXAMPLE 25

A mixture prepared by dissolving 0.1 g/kg of 1,4(8)p-menthadiene, 0.03 g/kg of 2,2'-azobis (4-methoxy-2,4-dimethyl valeronitrile), 0.5 g/kg of di-t-butylperoxyhexahydroterephthalate, and 3 g/kg of di-t-butyl peroxide in 90 parts by weight of methyl methacrylate containing 8% by weight of polymethyl methacrylate having an average polymerization degree of about 20,000 and 10 parts by weight of 2,2-diemthylol propane dimethacrylate was polymerized by following the procedure of Example 1 to obtain a partially cross-linked gel having a gel content of 36%. Then, on the same mold as used in Example 1 and heated in advance to 135° C., an abrasion resistant layer-forming material prepared by dissolving 1.0% by weight of benzoyl peroxide and 4.0% by weight of t-butylperoxyisopropyl carbonate in 40 parts by weight of a caprolactam-modified dipentaerythritol hexacylate (produced by Nippon Kayaku Co., Ltd. and marketed under product code of "DPCA-20"), 40 parts by weight of tris-acryloyl cyanurate, 20 parts by weight of 1.6-hexanediol diacrylate, and 20 parts by weight of methyl methacrylate was applied by spraying and thermally polymerized for 45 seconds. Then, the aforementioned partially cross-linked gel was superposed on the formed layer and kept pressed for 10 minutes. Then, the molded product consequently obtained was removed from the mold and subjected to 10 hours' post-polymerization in a hot air circulation drier at 120° C. It was tested for abrasion resistance and tightness of adhesion by following the procedure of Example 8. The results were as shown in Table 1.

EXAMPLE 26

A mixture prepared by dissolving 0.08 g/kg of 1,4(8)-p-menthadiene, 0.05 g/kg of cumyl peroxy decanoate, 0.5 g of dibutylperoxyhexahydroterephthalate, 1.0 g/kg of 2,2-bis(t-butylperoxy)butane and 3 g/kg of di-t-butyl peroxide in 95 parts by weight of methyl methacrylate containing 8% by weight of polymethyl methacrylate having an average polymerization degree of about 20,000 and 5 parts by weight of 2,2-diemthylol propane dimethacrylate was polymerized for 2.5 hours by following the procedure of Example 1 to obtain a partially cross-linked gel having a gel content of 25%. Then, on the same mold as used in Example 1 and heated in advance to 135° C., an abrasion resistant layer-forming material having the same formulation as that of Example 25 was applied by spraying and thermally polymerized for 45 seconds. Then, the aforementioned partially cross-linked gel was superposed on the formed layer and kept pressed for 10 minutes, and the temperature of the mold was decreased to 100° C. Then, the molded product consequently obtained was subjected to 10 hours' post-polymerization in a hot air circulation drier at 115° C. It was tested for abrasion resistance and tightness of adhesion by following the procedure of Example 8. The results were as shown in Table 1.

EXAMPLE 27

A mixture prepared by dissolving 0.1 g of 1,4(8)-p-menthadiene, 0.03 g of 2,2'-azobis(4-methoxy-2,4dimethyl valeronitrile), 0.5 g of di-t-butylperoxyhexahydroterephthalate, 1 g of 2,2-bis (t butylperoxy)-butane, and 3 g of di-t-butyl peroxide each per kg in 75 parts by weight of methyl methacrylate syrup containing 8% by weight of polymethyl metahcrylate having an average polymerization degree of about 20,000 and 25 parts by weight of 2,2-diemthylol propane dimethacrylate was polymerized by following the procedure of Example 1 to obtain a partially cross-linked gel having a gel content of 34%. Then, on the same mold as used in Example 1 and heated in advance to 135° C., the same abrasion resistant layer-forming material as used in Example 25 was applied by spraying and subjected to thermal polymerization for 43 seconds. The molded product consequently obtained was removed from the mold and subjected to 10 hours' post-polymerization at 130° C. and tested for abrasion resistance and tightness of adhesion by following the procedure of Example 1. The polymerization ratio of the abrasion layer-forming material was determined by following the procedure of Example 8. The results were as shown in Table 1.

EXAMPLE 28

A portion having an area equal to the projected surface area of the mold was cut from the partially cross-linked gel obtained in Example 25 and having a gel content of 36%, placed in the same mold as used in Example 1 heated in advance to 130° C., and kept pressed therein for 80 seconds. On the surface of the partially polymerized material unremoved from the mold, the same abrasion resistant layer-forming material as used in Example 25 was applied by spraying. The mold was closed immediately on the combined materials to keep them pressed for 10 minutes. The molded product consequently formed therein was removed from the mold and subjected to 10 hours' post-polymerization at 130° C. in a hot air circulation drier. It was tested for abrasion resistant and tightness of adhesion by following the procedure of Example 1. The gel content of the basic molding material was determined by following the procedure of Example 4. The results were as shown in Table 1.

CONTROL 9

The same partially cross-linked gel as obtained in Example 8 was placed in the cavity of the same mold as used in Example 1 and heated in advance to 130° C. and kept pressed for 10 minutes in the closed mold. The molded polymer was removed from the mold and irradiated with the light from a high-pressure mercury vapor lamp (main wavelength 365 nm having an output of 80 W/cm to a total dosage of $8.5 \times 10^4$ (wat.sec./m$^2$)

for the purpose of conferring adhesiveness upon the molded polymer relative to the abrasion resistant layer-forming material. Then, on the treated surface of the polymer, the same abrasion resistant layer-forming material as used in Example 1 was applied in a thickness of 10 to 20 μm by spraying and subjected to 10 hours' post-polymerization at 130° C. to be simultaneously polymerized and solidified, giving rise to an abrasion resistant layer. The results of the tests conducted on the molded product were as shown in Table 1.

EXAMPLE 29

The shaped articles obtained in Example 21, Example 9, and Control 9 and commercially available abrasion resistant plate were subjected to an ultraviolet light accelerated exposure test with a QUV weathering tester (produced by Toyo Seiki Seisakusho and marketed under produce code of "UVCON") under the conditions of UV 70° C. 8 hours 50° C. condensation cycle. Then, the difference of haze was found by the same steel wool test as used in Example 1. By plotting the time of ultraviolet light accelerated exposure vs. the difference of haze, there is obtained a curve shown in the diagram.

articles possessing highly desirable adhesiveness and abrasion resistance and enjoying highly satisfactory heat resistance thermal stability. To be more specific:

(1) Examples 1–7 and 28 and Controls 1–3 which regard the gel content of basic molding material demonstrate that the molded articles using molding materials whose gel contents were less than 10% and not less than 96% suffered from deformation and poor adhesion of coat, whereas the other molded articles acquired highly satisfactory adhesiveness and abrasion resistance on being molded.

(2) Examples 8–27 and Controls 4–7 which regard the number, x, of acryloyl groups and the ratio of polymerization of abrasion resistant layer-forming material demonstrate that when monomers having as a main component thereof a crosslinked polymerizing compound containing at least two acryloyloxy groups in the molecular unit or partial polymers of such monomers were used and they had compositions such that the numbers, x, of acryloyloxy groups and the ratios of polymerization, y(%), of abrasion resistant layer-forming materials satisfied the formula I or formula II, the molded products consequently formed enjoyed highly satisfactory adhesiveness and abrasion resistance on being molded.

TABLE 1

| Example | Ratio of polymerization of layer-forming material (%) Extraction method | Ratio of polymerization of layer-forming material (%) IR method | Gel content of molding material (%) | Pencil hardness | Steel wool test | Taber abrasion test | Adhesiveness | Heat Resistance* (HDT)(°C.) | Remark |
|---|---|---|---|---|---|---|---|---|---|
| Control 1 | 0 | 0 | 10 | — | — | — | — | 128 | Heavy deformation of molded product |
| Example 1 | 0 | 0 | 22 | 7H | 0.4 | 1.5 | 100/100 | 139 | |
| Example 2 | 0 | 0 | 34 | 8H | 0 | 0.1 | 100/100 | 140 | |
| Example 3 | 0 | 0 | 74 | 8H | 0 | 0.3 | 100/100 | 146 | |
| Example 4 | 0 | 0 | 29 | 8H | 0.1 | 0.3 | 100/100 | 138 | |
| Example 5 | 0 | 0 | 30 | 8H | 0.2 | 0.2 | 100/100 | 140 | |
| Example 6 | 0 | 0 | 32 | 8H | 0 | 0.5 | 100/100 | 143 | |
| Example 7 | 0 | 0 | 46 | 8H | 0.3 | 0.4 | 100/100 | 141 | |
| Control 2 | 0 | 0 | 96 | 6H | 2.4 | 15.0 | 65/100 | 137 | |
| Control 3 | 0 | 0 | 100 | — | — | — | 0/100 | 141 | |
| Example 8 | 41 | 54 | 36 | 8H | 0 | 0.5 | 100/100 | 140 | |
| Example 9 | 47 | 58 | 36 | 8H | 0.4 | 1.3 | 100/100 | 139 | |
| Example 10 | 62 | 64 | 36 | 8H | 0 | 0.7 | 100/100 | 136 | |
| Example 11 | 64 | 65 | 36 | 8H | 0.2 | 0.5 | 100/100 | 137 | |
| Control 4 | 67 | 66 | 36 | — | — | — | 0/100 | 138 | |
| Example 12 | 47 | 58 | 74 | 8H | 0.7 | 1.1 | 100/100 | 140 | |
| Example 13 | 62 | 64 | 74 | 8H | 0.6 | 0.8 | 100/100 | 138 | |
| Example 14 | 47 | 58 | 22 | 7H | 0.3 | 1.2 | 100/100 | 137 | |
| Example 15 | 62 | 64 | 22 | 8H | 0 | 0.7 | 100/100 | 139 | |
| Example 16 | 43 | 65 | 36 | 7H | 0.3 | 2.4 | 100/100 | 141 | |
| Example 17 | 53 | 68 | 36 | 7H | 0.4 | 1.5 | 100/100 | 140 | |
| Example 18 | 62 | 69 | 36 | 7H | 0 | 1.8 | 100/100 | 140 | |
| Example 19 | 68 | 70 | 36 | 7H | 0.2 | 1.1 | 100/100 | 140 | |
| Control 5 | 72 | 72 | 36 | — | — | — | 0/100 | 141 | |
| Example 20 | 64 | 38 | 36 | 8H | 0 | 1.3 | 100/100 | 142 | |
| Example 21 | 66 | 41 | 36 | 8H | 0 | 1.6 | 100/100 | 141 | |
| Control 6 | 68 | 43 | 36 | — | — | — | 0/100 | 138 | |
| Example 22 | 70 | 53 | 34 | 9He | 0 | 1.8 | 100/100 | 137 | |
| Example 23 | 80 | 66 | 34 | 9He | 0 | 1.5 | 100/100 | 142 | |
| Control 7 | 88 | 71 | 34 | — | — | — | 0/100 | 139 | |
| Control 8 | — | — | 36 | 4H | 12.3 | 17.8 | — | 143 | No abrasion resistant film |
| Example 24 | 43 | 56 | 36 | 8H | 0 | 0.2 | 100/100 | 144 | |
| Example 25 | 48 | 60 | 36 | 7H | 0.4 | 0.1 | 100/100 | 123 | |
| Example 26 | 49 | 60 | 25 | 7H | 0 | 0.2 | 100/100 | 118 | |
| Example 27 | 47 | 59 | 34 | 7H | 0 | 0.3 | 100/100 | 146 | |
| Example 28 | 0 | 0 | 90 | 7H | 0 | 0.8 | 100/100 | 138 | |
| Control 9 | 0 | 0 | 100 | 7H | 0 | 1.9 | 100/100 | 140 | |

*HDT: Heat Distorsion Temperature tested by JIS K 7202

From the working examples cited above, Table 1 given above, and the drawing attached hereto, it is noted that this invention permits production of molded (3) As concerns the abrasion resistance to be exhibited after the weatherability test for determination of durability, FIG. 1 shows that, in the molded articles of working examples of this invention, the degradation in the abrasion resistance as the function of time of exposure to ultraviolet light were half of those observed in the commercially available abrasion resistant plate and the shaped article of control which was obtained by applying an abrasion resistant thin film on a separately finished molded article.

As described above, the present invention uses the abrasion resistant layer-forming material which is made of a monomer having as a main component thereof a cross-linked polymerizing compound possessing a molecular weight of not less than 150 and containing at least two (meth)acryloyloxy groups per molecule or a partial polymer of the aforementioned monomer, possesses a composition such that the number, x, of (meth)acryloyloxy groups and the ratio of polymerization, y(%), satisfy the formula I or formula II, and is capable of forming on the surface of a basic molding material of excellent heat resistance, simultaneously with the formation of the molding material in a prescribed shape, an abrasion resistant layer. It, therefore, permits production of a molded article of methacrylic resin which enjoys highly satisfactory adhesiveness of the molding material to the abrasion resistant layer and exhibits outstanding abrasion resistance and possesses high heat resistant such that the abrasion resistance is minimally affected by exposure to natural conditions. Further, this invention offers an advantage that the process of production is simple because of simultaneous molding.

The molded articles obtained by this invention, therefore, find utility in applications demanding weatherability, abrasion resistance, and heat resistance such as, for example, in applications to head lamp lens and lamp covers in automobiles, meter covers in two-wheelers, and covers for solar heat water warmers.

What is claimed is:

1. A method for the production of a molded article of methacrylic resin formed of a cross-linked polymer having at least part of the surface thereof coated with an abrasion resistant layer, which method comprises placing (A) an abrasion resistant layer-forming material selected from the group consisting of (a) cross-linked polymerizing compounds having a molecular weight of not less than 150 and containing at least two (meth)acryloyloxy groups per molecule, (b) mixtures of at least 30% by weight of said cross-linked polymerizing compounds with other copolymerizable monomers, and (c) partial polymerization products thereof, and possessed of a composition such that the number, x, of said (meth)acryloyloxy groups of said cross-linked polymerizing compound and the ratio of polymerization, y (%), of said scratch proofing layer-forming material satisfy the following formula I or II:

$$y \leq 70 \; (2 \leq x \leq 3.5) \quad (I)$$

$$y \leq -7.5x^2 + 52x - 18 \; (3.5 < x \leq 6) \quad (II)$$

in contact with (B) a basic molding material made of an acrylic partially cross-linked gelled polymer obtained by partially polymerizing a mixture of (i) a resin material selected from the group consisting of alkyl methacrylate monomers, mixtures of alkyl methacrylates as main components with $\alpha, \beta$-ethylenically unsaturated monomers, and syrups weight, based on 100 parts by weight of said resin material, of a cross-linking agent and stopping said partial polymerization when the gel content of the basic molding material reaches a level in the range of 15 to 95% thereby allowing said material consequently produced to possess the property of retaining the polymerization in a stopped state, and simultaneously polymerizing said two materials held in mutual contact under a condition capable of imparting a desired shape to the combined materials.

2. A method according to claim 1, wherein said basic molding material is introduced into the mold of molding machine and subjected to molding therein after said abrasion resistant layer-forming material is applied on said mold and the ratio of polymerization thereof is adjusted in advance.

3. A method according to claim 1, wherein said abrasion resistant layer-forming material is applied on the surface of said basic molding material and the coated basic molding material is introduced into said mold of a press molding machine and subjected in situ to molding.

4. A method according to claim 3, wherein the ratio of elongation of said basic molding material is less than 72%.

5. A method according to claim 1, wherein said abrasion resistant material is applied on film such as of synthetic resin and polymerized to a desired ratio of polymerization in air and, thereafter, said basic molding material is superposed on the partially polymerized abrasion resistant material, introduced into said mold, and subjected to molding in situ.

6. A method according to claim 1, wherein said basic molding material is introduced in said mold and polymerized in situ to a prescribed ratio, the mold is opened and said abrasion resistant layer-forming material is applied on the surface of said mold or on the surface of said basic molding material, the mold is closed again, and the two materials are subjected to molding in situ.

* * * * *

UNITED STATES PATENT AND TRADEMARK OFFICE
CERTIFICATE OF CORRECTION

PATENT NO. : 4,830,803

DATED : May 16, 1989

INVENTOR(S) : Shigeo Matsumaru, Akihiro Mochizuki, Syuzi Isoi

It is certified that error appears in the above-identified patent and that said Letters Patent is hereby corrected as shown below:

Col. 1, line 17; "scratch proofness" should read --scratch-proofness--

Col. 4, line 26; insert -- in -- before the word "contact"

Col. 5, line 44; insert -- not -- after "do"

Col. 8, line 41; "partialy" should read -- partially --

Col. 10, line 34; "estabilish" should read -- establish --

Col. 12, line 37; "minute," should read -- minutes, --

Col. 13, line 47; insert -- 1 -- before "0"

Col. 14, line 49; "aprallelly" should read -- parallelly --

Col. 14, line 55; insert -- abrasion -- after "for"

Col. 20, line 14; insert -- containing polymers thereof with (ii) 3 to 30 parts by -- after "syrups"

Signed and Sealed this

Nineteenth Day of June, 1990

*Attest:*

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,830,803
DATED : May 16, 1989
INVENTOR(S) : Shigeo Matsumaru, Akihiro Mochizuki and Syuzi Isoi It is certified that error appears in the above-identified patent and that said Letters Patent is hereby corrected as shown below:

Col. 2, line 8; "plolymerizing" should read -- polymerizing --

Col. 3, line 14; "articles" should read -- article --

Col. 3, line 19; "articles" should read -- article --

Signed and Sealed this

Third Day of September, 1991

Attest:

HARRY F. MANBECK, JR.

Attesting Officer

Commissioner of Patents and Trademarks